United States Patent
Kano et al.

(10) Patent No.: US 11,906,439 B2
(45) Date of Patent: Feb. 20, 2024

(54) OPTICAL INSPECTION METHOD, NON-TRANSITORY STORAGE MEDIUM STORING OPTICAL INSPECTION PROGRAM, AND OPTICAL INSPECTION APPARATUS

(71) Applicants: KABUSHIKI KAISHA TOSHIBA, Tokyo (JP); TOSHIBA DIGITAL SOLUTIONS CORPORATION, Kawasaki (JP)

(72) Inventors: Hiroya Kano, Kawasaki Kanagawa (JP); Hiroshi Ohno, Tokyo (JP)

(73) Assignees: Kaushiki Kaisha Toshiba, Tokyo (JP); Toshiba Digital Solutions Corporation, Kawasaki (JP)

(*) Notice: Subject to any disclaimer, the term of this patent is extended or adjusted under 35 U.S.C. 154(b) by 45 days.

(21) Appl. No.: 17/681,396

(22) Filed: Feb. 25, 2022

(65) Prior Publication Data
US 2023/0066704 A1 Mar. 2, 2023

(30) Foreign Application Priority Data
Aug. 24, 2021 (JP) .................................. 2021-136474

(51) Int. Cl.
*G01N 21/88* (2006.01)
(52) U.S. Cl.
CPC . *G01N 21/8806* (2013.01); *G01N 2021/8887* (2013.01)
(58) Field of Classification Search
CPC ....... G01N 21/8806; G01N 2021/8887; G02B 27/00
See application file for complete search history.

(56) References Cited

U.S. PATENT DOCUMENTS 7,339,661 B2 * 3/2008 Korngut ............ G01N 21/4788
250/234
7,826,047 B2 * 11/2010 Shibata .................. G06T 7/001
356/237.2

(Continued)

FOREIGN PATENT DOCUMENTS

JP 2019-124542 A 7/2019
JP 2019-203796 A 11/2019

OTHER PUBLICATIONS

W.L. Howes, "Rainbow schlieren and its applications," Applied Optics, vol. 23, No. 14, pp. 2449-2460 (1984).

*Primary Examiner* — Hung V Nguyen
(74) *Attorney, Agent, or Firm* — Finnegan, Henderson, Farabow, Garrett & Dunner, LLP

(57) ABSTRACT

According to the embodiment, an optical inspection method includes: emitting, acquiring, and comparing. The emitting includes emitting light beams having a first wavelength and a second wavelength toward an imaging unit in accordance with light beam directions from a subject, with light beam intensities of the first wavelength and the second wavelength being in a complementary relationship. The acquiring includes acquiring each of information of a first image related to the first wavelength and information of a second image related to the second wavelength with the imaging unit. The comparing includes comparing the information of the first image and the information of the second image to extract unevenness information of the subject.

12 Claims, 14 Drawing Sheets

(56) References Cited

U.S. PATENT DOCUMENTS

| | | | |
|---|---|---|---|
| 8,228,494 B2 * | 7/2012 | Shibata | G01N 21/95623 356/237.4 |
| 9,575,010 B2 * | 2/2017 | Ogawa | G01N 21/956 |
| 10,732,102 B2 | 8/2020 | Ohno et al. | |
| 10,812,786 B2 | 10/2020 | Ohno et al. | |

\* cited by examiner

Filter program
- Sobel filter
- Canny filter
- Laplacian filter
- Averaging filter
- Smoothing filter (Gaussian filter)
- Median filter
- First differential filter
- Pre-bit filter
- Low-pass filter
- High-pass filter
- Band-pass filter
- Edge enhancement filter
- Edge extraction filter
- ...
- ...

F I G. 5

OPTICAL INSPECTION METHOD, NON-TRANSITORY STORAGE MEDIUM STORING OPTICAL INSPECTION PROGRAM, AND OPTICAL INSPECTION APPARATUS

CROSS-REFERENCE TO RELATED APPLICATIONS

This application is based upon and claims the benefit of priority from Japanese Patent Application No. 2021-136474, filed Aug. 24, 2021, the entire contents of all of which are incorporated herein by reference.

FIELD

Embodiments described herein relate generally to an optical inspection method, a non-transitory storage medium storing an optical inspection program, and an optical inspection apparatus.

BACKGROUND

In various industries, contactless optical inspection of objects is important. In optical inspection, identification of a light beam direction is important for knowing object information. Conventionally, there is a method of identifying a light beam direction using an amount called hue.

BRIEF DESCRIPTION OF THE DRAWINGS

FIG. 5 is a diagram illustrating an example of an image filter program used in the optical inspection apparatus of the optical inspection system according to the first and second embodiments;

DETAILED DESCRIPTION

Figure 1:
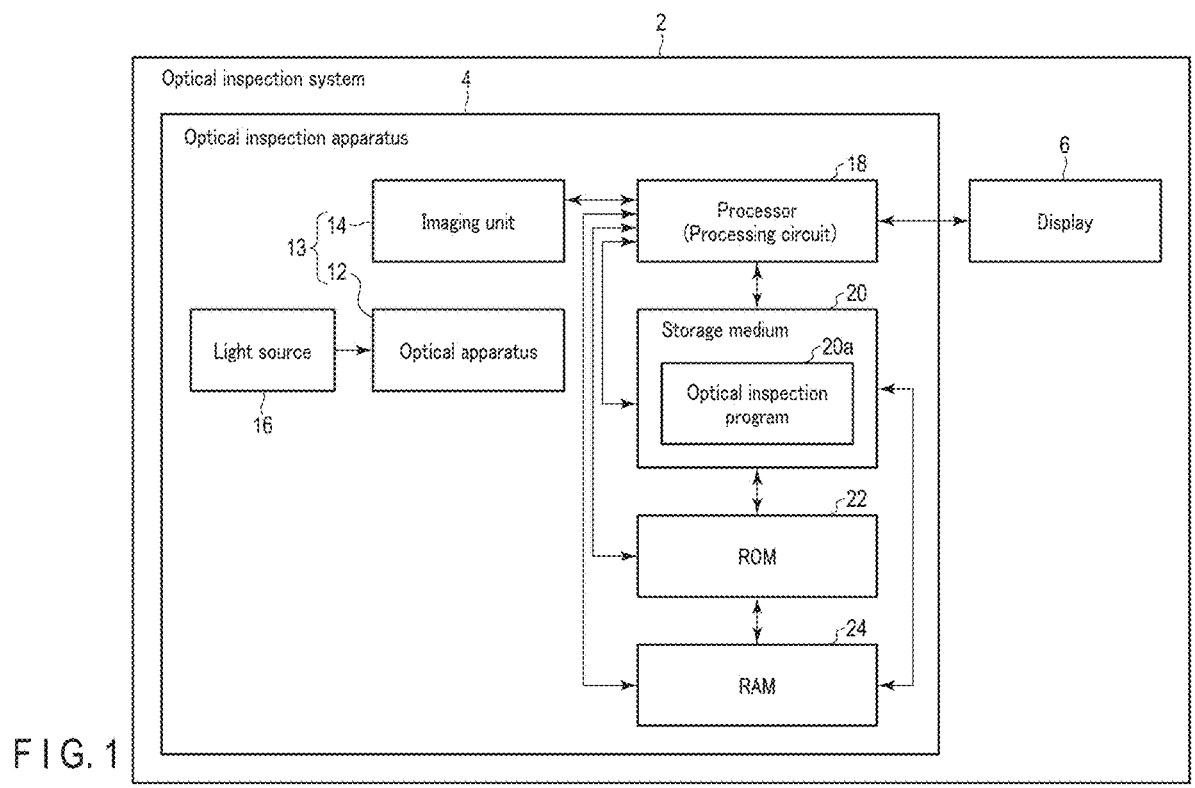
FIG. 1 is a schematic block diagram illustrating an optical inspection system according to first and second embodiments.

An object of an embodiment is to provide an optical inspection method for acquiring an image including information related to a light beam direction from a subject and inspecting a surface state of the subject, a non-transitory storage medium storing an optical inspection program, and an optical inspection apparatus.

According to the embodiment, an optical inspection method for inspecting a subject, includes: emitting, acquiring, and comparing. The emitting includes emitting a light beam having a first wavelength and a light beam having a second wavelength different from the first wavelength toward an imaging unit in accordance with light beam directions from a subject, with a light beam intensity of the first wavelength and a light beam intensity of the second wavelength being in a complementary relationship. The acquiring includes acquiring each of information of a first image related to the light beam having the first wavelength and information of a second image related to the light beam having the second wavelength with the imaging unit. The comparing includes comparing the information of the first image and the information of the second image to extract unevenness information of the subject.

Hereinafter, each embodiment will be described with reference to the drawings. The drawings are schematic or conceptual, and the relationship between thickness and width of each portion, a ratio of sizes between portions, and the like are not necessarily the same as the actual ones. In addition, even in the case of representing the same portion, dimensions and ratios may be represented differently from each other depending on the drawings. In the specification of the present application and the drawings, the same reference numerals are given to the same elements as those described above with respect to the previously described drawings, and the detailed description is appropriately omitted.

First Embodiment

An optical inspection system 2 according to the present embodiment will be described with reference to FIGS. 1 to 11.

FIG. 1 is a block diagram illustrating an example of a configuration of the optical inspection system 2 according to the present embodiment. As illustrated in FIG. 1, the optical inspection system 2 includes an optical inspection apparatus 4 and a display 6.

The optical inspection apparatus 4 includes an optical apparatus 12, an imaging unit 14, a light source 16, a processor 18, a non-transitory storage medium 20, a read only memory (ROM) 22, and a random access memory (RAM) 24. The optical apparatus 12 and the imaging unit 14 constitute a so-called camera 13.

Figure 2:
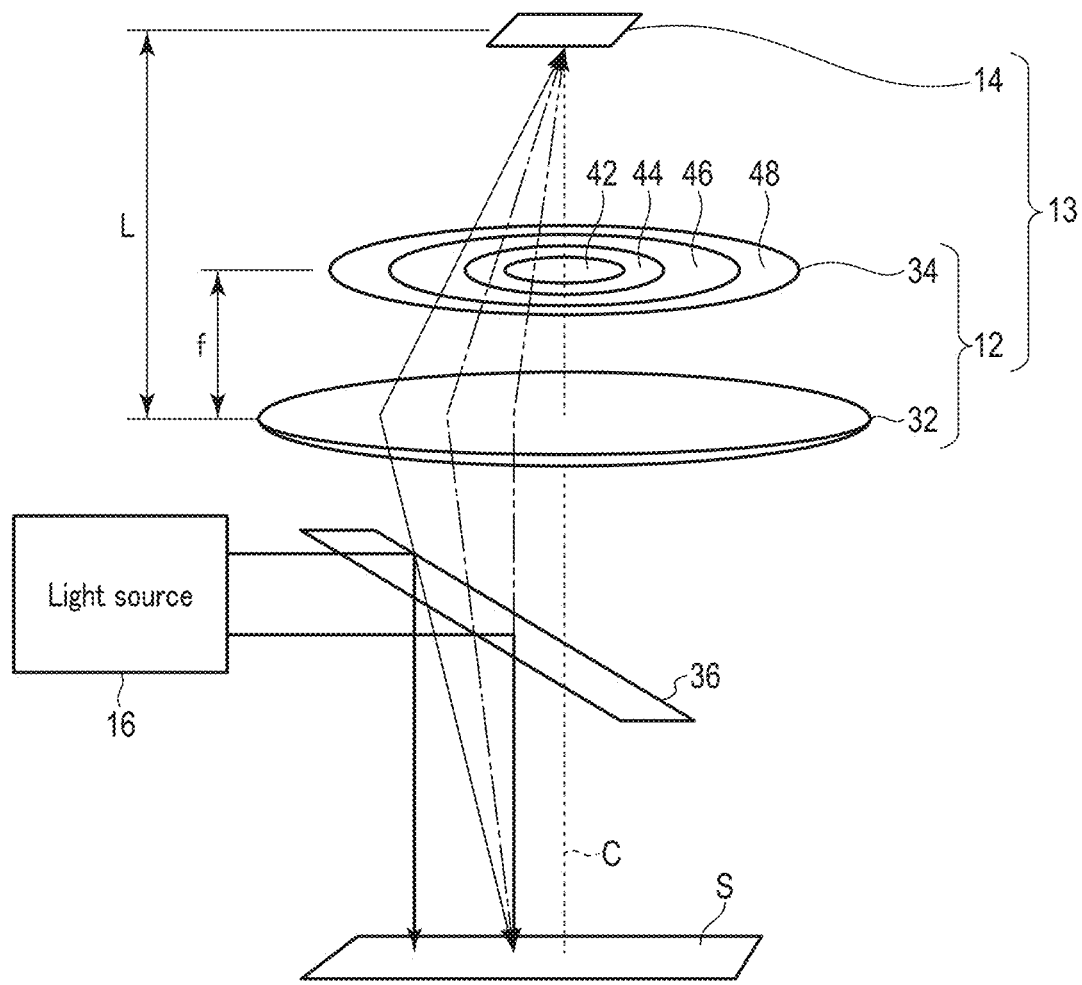
FIG. 2 is a schematic perspective view illustrating a part of an optical inspection apparatus of an optical inspection system according to the first embodiment.

As illustrated in FIG. 2, the optical apparatus 12 includes an image forming optical system (image forming lens) 32 and a color filter (multi-wavelength aperture) 34.

The image forming optical system 32 is formed by combining one or a plurality of lenses. The image forming optical system 32 forms an image of a light beam from the subject. An optical axis C of the image forming optical system 32 coincides with the optical axis (central axis) of the color filter 34. The color filter 34 is disposed rotationally symmetrically with respect to the optical axis of the image forming optical system 32 on the focal plane at a distance f with respect to the image forming optical system 32. The imaging unit 14 is disposed on an optical path of light passing through the image forming optical system 32 and the color filter 34. The imaging unit 14 is provided on an image forming plane at a distance L (>f) with respect to the image forming optical system 32.

Note that light is a type of electromagnetic wave, and the light includes X-rays, ultraviolet rays, visible light, infrared rays, microwaves, and the like. In the present embodiment, light is visible light, and for example, the wavelength is in a region of 400 nm to 760 nm.

Figure 3:
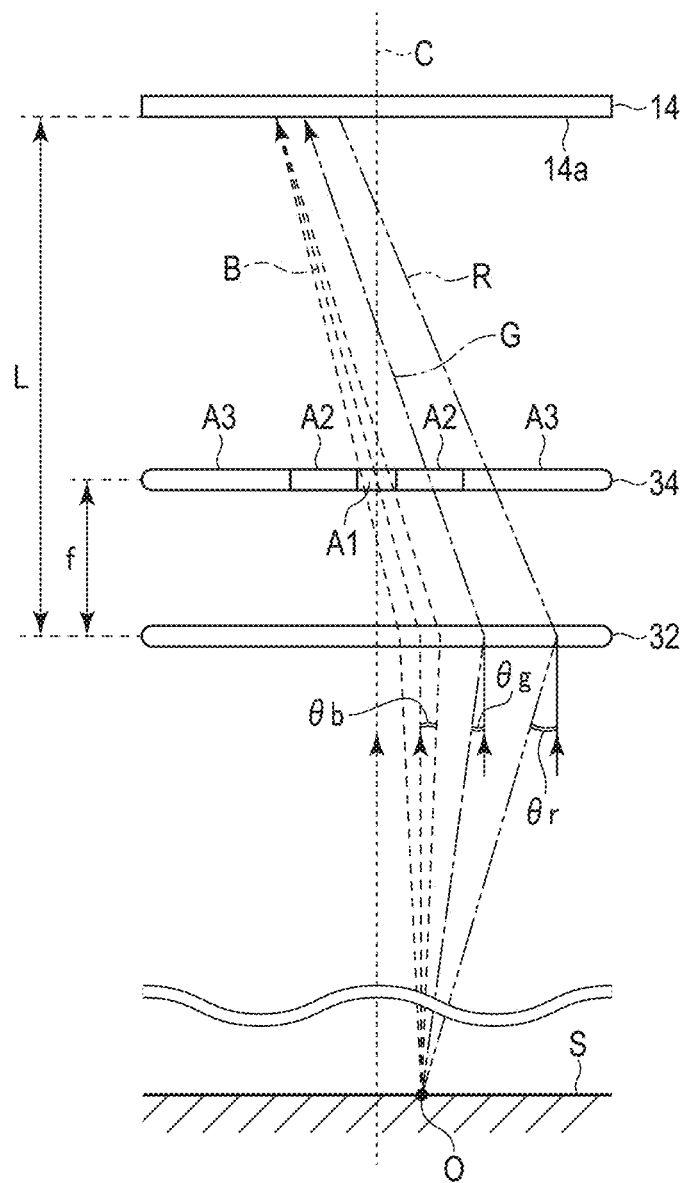
FIG. 3 is a schematic diagram illustrating a part of the optical inspection apparatus of the optical inspection system according to the first embodiment.

FIG. 3 is an enlarged view of a part of the optical apparatus 12 and the imaging unit 14 illustrated in FIG. 2. As illustrated in FIG. 3, for example, a light beam L11 specularly reflected at a certain object point O of a subject S and light beams L21 and L31 scattered at appropriate angles are refracted by the image forming optical system 32, and light beams L12, L22, and L32 form an image on an imaging surface 14a of the imaging unit 14.

Figure 4:
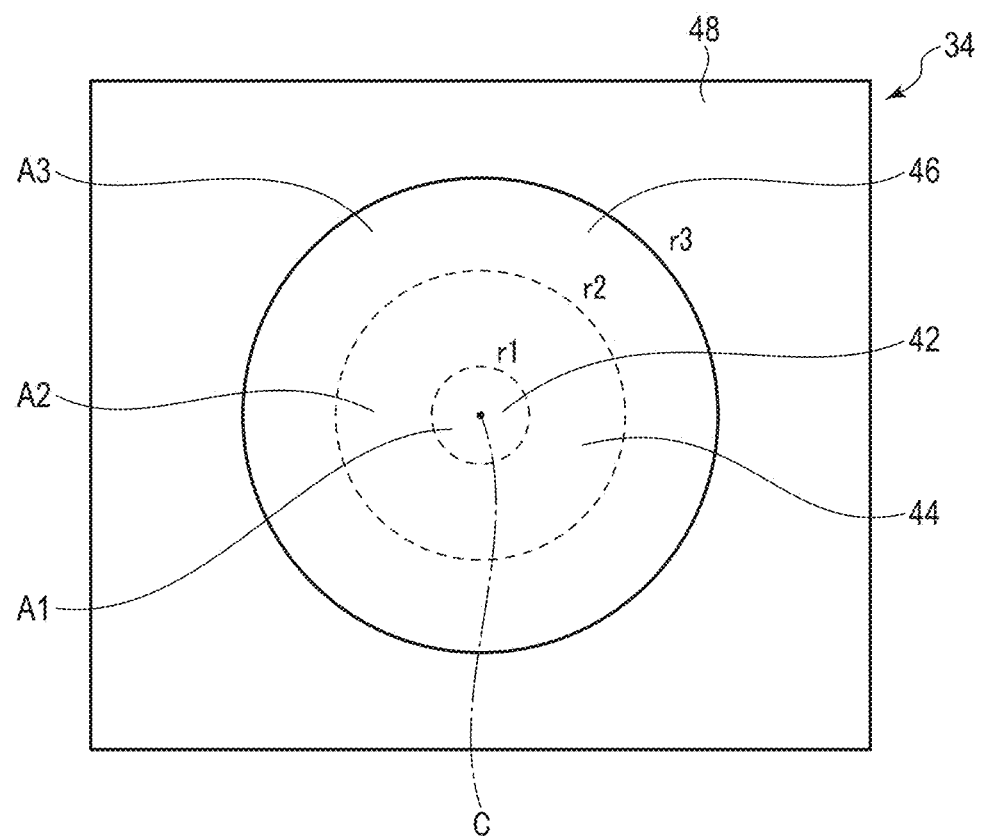
FIG. 4 is a schematic view illustrating a color filter of an optical apparatus of the optical inspection apparatus illustrated in FIGS. 2 and 3.

As illustrated in FIG. 4, in the present embodiment, the color filter 34 includes a first wavelength selection filter (wavelength selection region) 42, a second wavelength selection filter (wavelength selection region) 44, and a third wavelength selection filter (wavelength selection region) 46. The first wavelength selection filter 42, the second wavelength selection filter 44, and the third wavelength selection filter 46 are concentrically formed. The color filter 34 has a property of transmitting a light beam having a specific wavelength (wavelength spectrum) and shielding a light beam having a wavelength deviating from the specific wavelength for each of the wavelength selection filters 42, 44, and 46.

The first wavelength selection filter 42 is formed in a disk shape. The first wavelength selection filter 42 is provided on the optical axis C of the image forming optical system 32. The first wavelength selection filter 42 passes the light beam having the first wavelength from the subject that passed through the image forming optical system 32. Note that the first wavelength selection filter 42 has a property of not transmitting and shielding a light beam having a wavelength different from the first wavelength (specific wavelength).

The second wavelength selection filter 44 is formed in an annular shape on the outer periphery of the first wavelength selection filter 42. The second wavelength selection filter 44 passes a light beam having the second wavelength different from the first wavelength from the subject that passed through the image forming optical system 32. The radial width of the second wavelength selection filter 44 can be set as appropriate. Note that the second wavelength selection filter 44 has a property of not transmitting and shielding a light beam having a wavelength different from the second wavelength (specific wavelength).

The third wavelength selection filter 46 is formed in an annular shape on the outer periphery of the second wavelength selection filter 44. The third wavelength selection filter 46 passes a light beam having the third wavelength different from the first wavelength and the second wavelength from the subject that passed through the image forming optical system 32. The radial width of the third wavelength selection filter 46 can be set as appropriate. Note that the third wavelength selection filter 46 has a property of not transmitting and shielding a light beam having a wavelength different from the third wavelength (specific wavelength).

It is preferable that the first wavelength does not overlap with the second wavelength and the third wavelength. In addition, it is preferable that the second wavelength does not overlap with the third wavelength. Therefore, the first wavelength, the second wavelength, and the third wavelength are independent from each other.

The color filter 34 has a light beam shielding unit 48 on the outer periphery of the third wavelength selection filter 46. The light beam shielding unit 48 is formed of, for example, a black plate, and holds the third wavelength selection filter 46. Note that the third wavelength selection filter 46 holds the second wavelength selection filter 44. The second wavelength selection filter 44 holds the first wavelength selection filter 42. The color filter 34 may be configured in a manner that light having a transmitted wavelength continuously changes from the inside to the outside, for example. That is, the color filter 34 is configured to pass through light of the same wavelength annularly with respect to the central axis common annularly from the inside to the outside, but not to pass through light of different wavelengths.

The radius of the outer periphery of the first wavelength selection filter 42 of the color filter 34 is r1, the radius of the outer periphery of the second wavelength selection filter 44 is r2, and the radius of the outer side of the third wavelength selection filter 46 is r3. At this time, r3>r2>r1 holds. Here, a region within the radius r1 of the first wavelength selection filter 42 is A1. A region between the outer periphery of the first wavelength selection filter 42 and the outer periphery of the second wavelength selection filter 44 is A2. A region between the outer periphery of the second wavelength selection filter 44 and the outer periphery of the third wavelength selection filter 46 is A3.

The radius r1 of the first wavelength selection filter 42, r2−r1 that is the distance between the outer periphery of the first wavelength selection filter 42 and the outer periphery of the second wavelength selection filter 44, and r3−r2 that is the distance between the outer periphery of the second wavelength selection filter 44 and the outer periphery of the third wavelength selection filter 46 can be set as appropriate. More specifically, the radius r1 of the first wavelength selection filter 42 of the color filter 34, the radius r2 of the second wavelength selection filter 44, and the radius r3 of the third wavelength selection filter 46 may change. Therefore, the shapes and sizes of the regions A1, A2, and A3 may change.

In the optical apparatus 12 according to the present embodiment, among the light beams emitted from the arbitrary object point O of the subject S, when the light beam is incident on the image forming optical system 32, blue (B) light in which the main light beam is parallel to the optical axis C is separated as a blue light beam. That is, the optical apparatus 12 according to the present embodiment is a telecentric optical system having telecentricity for a blue light beam. On the other hand, the optical apparatus 12 according to the present embodiment is a non-telecentric optical system having no telecentricity for red (R) light and green (G) light.

In the present embodiment, in order to simplify the description, for example, the color filter 34 transmits light of a certain wavelength for each of the wavelength selection filters 42, 44, and 46 among visible light, and shields a wavelength deviating from the certain wavelength, that is, prevents transmission.

In the present embodiment, for convenience, the wavelength of red (R) light is 700 nm, the wavelength of green (G) light is 546.1 nm, and the wavelength of blue (B) light is 435.8 nm, which are determined by the International Commission on Illumination (CIE: Commission Internationale de l'Eclairage).

In the present embodiment, the region A1 of the first wavelength selection filter 42 allows, among visible light, B light having, for example, blue light (435.8 nm) and the first wavelength in the vicinity to pass through, and blocks light having other wavelengths. In the present embodiment, the region A2 of the second wavelength selection filter 44 allows, among visible light, G light having, for example, green light (546.1 nm) and the second wavelength in the vicinity to pass through, and blocks light having other wavelengths. In the present embodiment, the region A3 of the third wavelength selection filter 46 allows, among visible light, R light having, for example, red light (700 nm) and the third wavelength in the vicinity to pass through, and blocks light having other wavelengths. Note that, in the present embodiment, it is preferable that the first wavelength range that the region A1 of the first wavelength selection filter 42 passes, the second wavelength range that the region A2 of the second wavelength selection filter 44 passes, and the third wavelength range that the region A3 of the third wavelength selection filter 46 passes do not overlap.

The optical apparatus 12 includes a half mirror (beam splitter) 36. The half mirror 36 is provided between the image forming optical system 32 and the subject S. The half mirror 36 illuminates the subject S with illumination light (white light) from the light source 16, transmits the light from the subject S, and causes the light to be incident on the image forming optical system 32.

The imaging unit 14 uses, for example, a so-called RGB camera. That is, the imaging unit 14 includes three color channels of R, G, and B in each pixel. For example, a CMOS image sensor or a CCD image sensor can be used as the imaging unit 14. Note that the imaging unit 14 has at least two pixels. A certain pixel and another certain pixel are in a proximal relationship in terms of distance. In the imaging unit 14 described in the present embodiment, it is assumed that, in all pixels, a large number of pixels are arranged in a lattice pattern, for example, a certain pixel and another certain pixel are located distally, and a certain pixel and another certain pixel are in the vicinity.

As illustrated in FIG. 3, the imaging unit 14 captures the light beam L12 having the first wavelength that passed through the image forming optical system 32 and the region A1 of the first wavelength selection filter 42, the light beam L22 having the second wavelength that passed through the image forming optical system 32 and the region A2 of the second wavelength selection filter 44, and the light beam L32 having the third wavelength that passed through the image forming optical system 32 and the region A3 of the third wavelength selection filter 46.

As the light source 16, for example, one that emits white light with appropriate luminance is used. Therefore, the illumination light of the light source 16 includes red (R) light, green (G) light, and blue (B) light.

The processor illustrated in FIG. 1 includes any one of a CPU (Central Processing Unit), an ASIC (Application Specific Integrated Circuit), a microcomputer, an FPGA (Field Programmable Gate Array), a DSP (Digital Signal Processor), and the like. A general-purpose computer may be used as the processor 18. The processor 18 is not limited to being provided as a dedicated circuit, and may be provided as a program executed by a computer. In this case, the program is recorded in a storage area, the storage medium 20, and the like in the integrated circuit. The processor 18 is connected to the imaging unit 14 and the storage medium 20. The processor 18 calculates information related to the subject S based on the output of the imaging unit 14.

As illustrated in FIG. 1, the processor (processing circuit) 18 has a function as an image processing unit for image data (RGB image data Irgb, R image data Ir, G image data Ig, and B image data Ib) captured by the imaging unit 14. Note that the image data acquired by the imaging unit 14 includes at least two or more pixels.

Note that the processor 18 may be outside the optical inspection apparatus 4. In this case, the output of the imaging unit 14 may be output to the outside of the optical inspection apparatus 4 or may be recorded in the storage medium 20. That is, the calculation of the information related to the subject S may be performed inside the optical inspection apparatus 4 or may be performed outside. The processor 18 may be in a server in a cloud service that sends and receives data via a network.

The processor 18, the ROM 22, and the RAM 24 are connected via a bus, for example. The storage medium 20, the ROM 22, and the RAM 24 can communicate with the processor 18.

The non-transitory storage medium 20 may include an auxiliary storage device, in addition to a main storage device such as a memory. The storage medium 20 is a nonvolatile memory such as an HDD, an SSD, or a flash memory, but may further include a volatile memory. Examples of the non-transitory storage medium 20 include a magnetic disk, an optical disc (e.g. CD-ROM, CD-R, DVD), a magneto-optical disc (e.g. MO), and a semiconductor memory. In the optical inspection apparatus 4, each of the number of processors and the number of non-transitory storage media may be one or plural. The storage medium 20 stores an optical inspection program 20a according to the present embodiment. The optical inspection program 20a may be stored in the ROM 22. The optical inspection program 20a may be installed in the optical inspection apparatus 4 in advance, may be stored in a nonvolatile storage medium, or may be distributed via a network. The optical inspection program 20a may be outside the optical inspection apparatus 4, for example, an appropriate server. In the optical inspection apparatus 4 the processor executes a program or the like stored in the non-transitory storage medium or the like, thereby executing a process. In addition, the program that is executed by the processor of the optical inspection apparatus 4 may be stored in a computer (server) connected to the optical inspection apparatus 4 via a network such as the Internet, or may be stored in a server or the like in a cloud environment. In this case, the processor downloads the program via the network.

In the present embodiment, the optical inspection program 20a includes various image filter programs (see FIG. 5) for selectively performing image filtering on various image data acquired by the imaging unit 14. That is, for example, the storage medium 20 stores various image filter programs. The image filter program can also be executed on a server via a network.

Note that the processor 18 selects one or a plurality of programs from, for example, the image filter program illustrated in FIG. 5 according to the image data by the optical inspection program 20a.

The image filter herein refers to a program that performs image filter processing with respect to an image obtained by the imaging unit 14. As illustrated in FIG. 5, various types of image filter programs can be used. The image filter program can use an appropriate spatial filter such as a Sobel filter, a Canny filter, a Laplacian filter, an averaging filter, a median filter, a first differential filter, and a pre-bit filter. Therefore, the spatial filter here includes a linear filter, a non-linear filter, a spatial differential, and the like. Furthermore, as the image filter program, a low-pass filter by Fourier transformation, a high-pass filter by Fourier transformation, a band-pass filter by Fourier transformation, an edge enhancement filter, an edge extraction filter, and other appropriate programs can be used in accordance with the extraction target.

Figure 8:
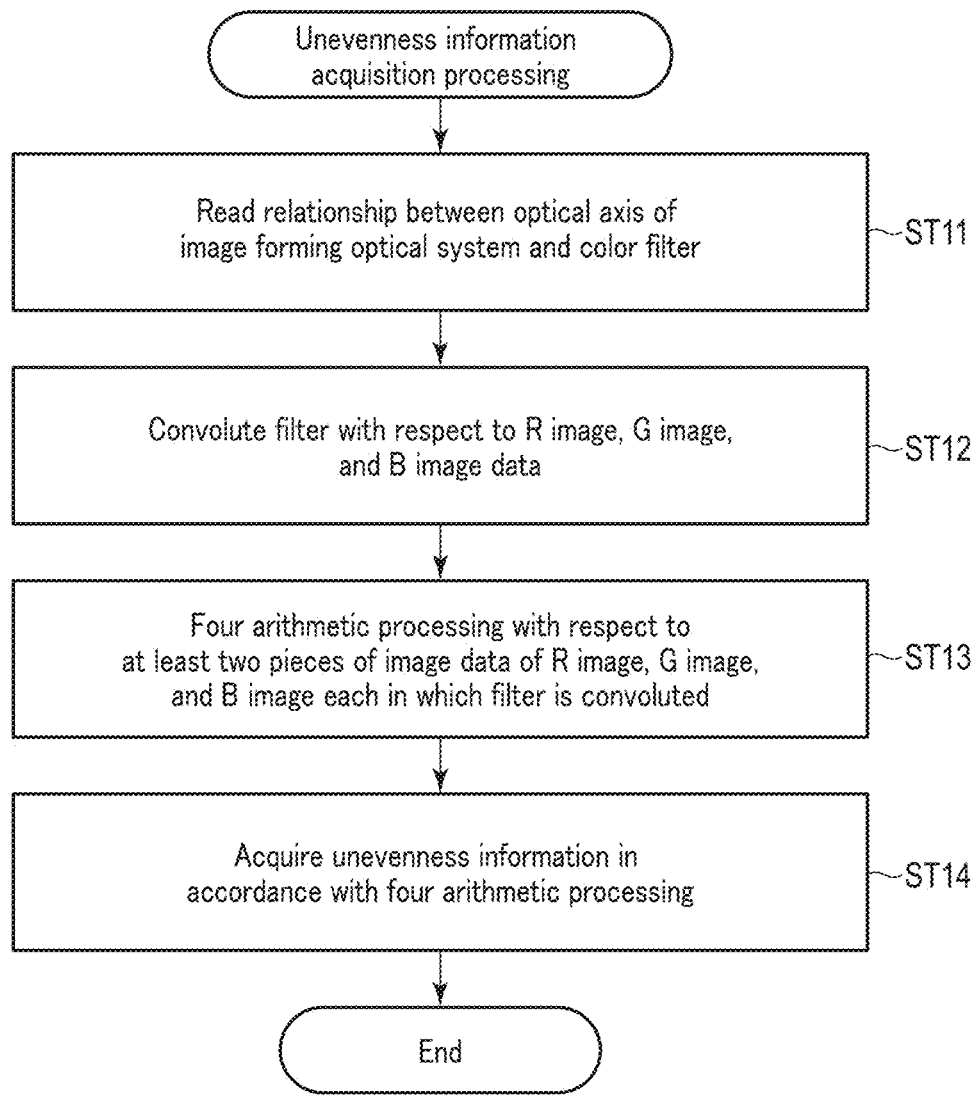
FIG. 8 is a flowchart illustrating arithmetic processing for acquiring surface information (unevenness information) of a subject using the optical inspection apparatus of the optical inspection system according to the first embodiment.

For example, the processor 18 writes the optical inspection program 20a stored in the storage medium 20 into the RAM 24 and executes the program, performing the function according to the flowchart illustrated in FIG. 8.

The storage medium 20 stores the relationship between the optical axis C of the image forming optical system 32 and the color filter 34. The relationship between the optical axis C of the image forming optical system 32 and the color filter 34 includes, for example, the transmission wavelength, the shielding wavelength, and the arrangement of the first wavelength selection filter 42, the second wavelength selection filter 44, the third wavelength selection filter 46, and the light beam shielding unit 48 of the color filter 34.

Here, the subject S with a gray plastic plate artificially scratched was prepared, and the subject S was inspected using the optical inspection apparatus 4.

As the subject S, an abnormal portion (scratched portion) S2 having a width and a depth of, for example, about 0.5 mm and a length of about 10 mm with respect to a standard surface S1 was formed. A boundary between the standard surface S1 and the abnormal portion S2 is referred to as an edge portion S3. Note that the prepared standard surface S1 of the surface of the subject S is preferably formed as a smooth plane without scratches, but fine scratches are formed on the standard surface S1 of the surface of the subject S.

Figure 6:
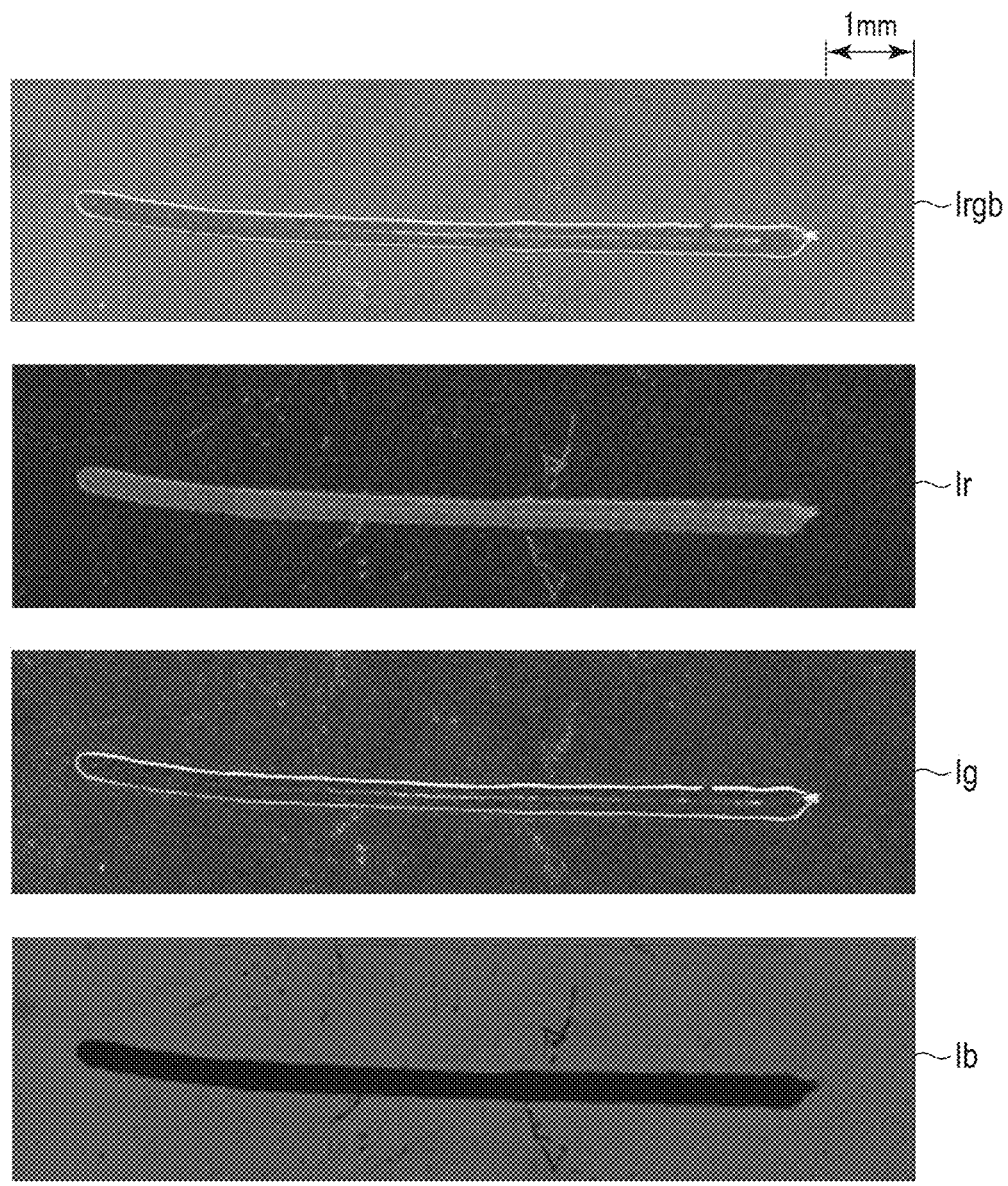
FIG. 6 is an image showing RGB image data, R image data, G image data, and B image data captured by the optical inspection apparatus of the optical inspection system according to the first embodiment.

Then, FIG. 6 illustrates RGB image data Irgb, R image data Ir, G image data Ig, and B image data Ib when the subject S including the standard surface S1, the abnormal portion S2, and the edge portion S3 is captured by the camera 13 using the camera 13 according to the present embodiment.

The region A1 of the first wavelength selection filter 42 of the color filter 34 of the camera 13 according to the present embodiment illustrated in FIGS. 2 to 4 passes the B light of the specular reflection light component from the subject S, but shields the R light and the G light of the scattering light component. Therefore, only the specular reflection component is incident on the imaging unit 14 as the B light and captured as the B image data (first image data) Ib by the imaging unit 14. Note that the specular reflection component is not only a component completely parallel to the optical axis C, but also an appropriate deviation is allowed. In the present embodiment, the specular reflection component is in the range of $0 \leq \theta b$ illustrated in FIG. 3 when the direction along the optical axis C is 0. Note that the angle $\theta b$ may vary as appropriate. The angle $\theta b$ depends on the distance between the subject S and the color filter 34, the radius r1 of the region A1 of the first wavelength selection filter 42 of the color filter 34, and the like.

The region A2 of the second wavelength selection filter 44 of the color filter 34 of the camera 13 passes the G light of a first scattering angle $\theta g$ ($\theta b \leq \theta g < \theta r$) with respect to the optical axis C, but shields the B light of the specular reflection light component and the R light of another second scattering angle $\theta r$ ($\theta r \leq \theta$). Therefore, only the first scattering angle component is incident on the imaging unit 14 as the G light and captured as the G image data (third image data) Ig by the imaging unit 14. The angle $\theta g$ depends on the distance between the subject S and the color filter 34, the size of the region A2 of the second wavelength selection filter 44 of the color filter 34, and the like. The angle $\theta r$ depends on the distance between the subject S and the color filter 34, the size of the region A3 of the third wavelength selection filter 46 of the color filter 34, and the like.

The region A3 of the third wavelength selection filter 46 of the color filter 34 of the camera 13 passes the R light of the second scattering angle $\theta r$ with respect to the optical axis C, but shields the B light of the specular reflection light component and the G light of the first scattering angle $\theta g$. Therefore, only the second scattering angle component is incident on the imaging unit 14 as the R light and captured as the R image data (second image data) Ir by the imaging unit 14.

Therefore, the RGB image data Irgb, the R image data Ir, the G image data Ig, and the B image data Ib illustrated in FIG. 6 captured by the imaging unit 14 are colored according to the information of the scattering angle of the subject S. Therefore, the color of the obtained RGB image data Irgb does not depend on the color of the subject S itself, but changes by appropriately setting the wavelength passed through the color filter 34.

The standard surface S1 of the subject S excluding the abnormal portion S2 and the edge portion S3 has fine scratches, but most of the light is incident on the imaging unit 14 through the color filter 34 as specular reflection light. On the other hand, since most of the abnormal portion S2 and the edge portion S3 are not regions parallel to the standard surface S1, most of the light is incident on the imaging unit 14 through the color filter 34 as scattering light.

Among the light incident on the imaging unit 14 through the color filter 34, the light beam from the standard surface S1 is the B light passing on the optical axis C (on the region A1) of the color filter 34. Therefore, the imaging unit 14 obtains specular reflection light from the standard surface S1 as a blue image in the B image data Ib. Light from positions corresponding to the abnormal portion S2 and the edge portion S3 is not incident on the imaging unit 14 as B light. Therefore, the images of the abnormal portion S2 and the edge portion S3 in the B image data Ib are black regions.

In addition, in the light incident on the imaging unit 14 through the color filter 34, the light beam from the abnormal portion S2 is the R light passing through the region A3 deviated from the optical axis C of the color filter 34. Therefore, the imaging unit 14 obtains the scattering light from the abnormal portion S2 as a red image in the R image data Ir. Light from positions corresponding to the standard surface S1 and the edge portion S3 is not incident on the imaging unit 14 as R light. Therefore, the images of the standard surface S1 and the edge portion S3 in the R image data Ir are black regions.

In the light incident on the imaging unit 14 through the color filter 34, the light beam from the edge portion S3 is the G light passing through the region A2 deviated from the optical axis C of the color filter 34. Therefore, the imaging unit 14 obtains scattering light from the edge portion S3 as a green image in the G image data Ig. Light from positions corresponding to the standard surface S1 and the abnormal portion S2 is not incident on the imaging unit 14 as G light. Therefore, the images of the standard surface S1 and the abnormal portion S2 in the G image data Ig are black regions.

Note that the light beam intensities (pixel values) of the R image data Ir, the G image data Ig, and the B image data Ib acquired by the respective pixels of the imaging unit 14 of the optical inspection apparatus 4 according to the present embodiment change complementarily. That is, the camera 13 sets, for example, B light (light beam having the first wavelength) corresponding to the first scattering angle (including specular reflection) from the subject S as B image data (information of the first image), acquires, for example, R light (light beam having the second wavelength) different from the B light (light beam having the first wavelength) as R image data (information of the second image) according to the second scattering angle different from the first scattering angle from the subject S, and acquires the light beam intensity of the B light (first wavelength) and the light beam intensity of the R light (second wavelength) as a complementary relationship. The first scattering angle here includes specular reflection of 0°. In the optical inspection apparatus 4, when the light beam intensity of the R light is increased among the light beams passing through the color filter 34, the light beam intensity of the G light and the light beam intensity of the B light are weakened in a certain pixel. In addition, in another certain pixel, when the light beam intensity of the B light is increased, the light beam intensity of the R light and the light beam intensity of the G light are weakened.

With the color filter 34 used in the present embodiment, the B image data Ib has the highest average of the pixel values of the image data in the region corresponding to the standard surface S1, and the G image data Ig and the R image data Ir follow in this order.

A part of the R light from the position corresponding to the standard surface S1 is not completely incident on the imaging unit 14. A part of the R light from the position corresponding to the standard surface S1 has a pixel value lower than the average of the pixel values of the region corresponding to the standard surface S1 in the B image data Ib, but is incident on the imaging unit 14 as the R light. It can be said that fine scratches on the standard surface S1 formed of a plastic plate are captured.

Similarly, a part of the G light from the position corresponding to the standard surface S1 is not completely incident on the imaging unit 14. A part of the G light from the position corresponding to the standard surface S1 has a pixel value lower than the average of the pixel values of the region corresponding to the standard surface S1 in the B image data Ib, but is incident on the imaging unit 14 as the G light. It can be said that fine scratches on the standard surface S1 formed of a plastic plate are captured.

Therefore, the RGB image data Irgb obtained by the optical inspection apparatus 4 according to the present embodiment is colored according to the direction information of the light beam based on the color filter 34. The R image data Ir, the G image data Ig, and the B image data Ib obtained by separating the RGB image data Irgb into the respective color channels are images based on the surface information (unevenness information) of the subject S. As described above, the optical inspection apparatus 4 according to the present embodiment acquires the structure (unevenness) information of the subject S from the image captured by the imaging unit 14.

Then, when the image obtained by the imaging unit 14 is displayed as the channel data by using the optical inspection apparatus 4 according to the present embodiment, it is possible to obtain an image in which the standard surface S1 is separated as the blue B image data Ib, the abnormal portion S2 is separated as the red R image data Ir, and the edge portion S3 is separated as the green G image data Ig. Therefore, the processor 18 can extract the surface information (unevenness information) of the subject S by comparing the B image data Ib, the R image data Ir, and the G image data Ig. Comparing image data means comparing a combination of image data (that is, data including two or more pixels) with a combination of image data (data including two or more pixels). The processor 18 displays the extracted image data on the display 6 in a manner that the inspector can clearly view the extracted image data on the display 6. Then, image data obtained by adding the B image data Ib, the R image data Ir, and the G image data Ig is RGB image data Irgb. At this time, as illustrated in FIG. 6, the optical inspection apparatus 4 according to the present embodiment can obtain an image (RGB image data Irgb) that allows the inspector to visually confirm the standard surface S1, the abnormal portion S2, and the edge portion S3 clearly.

Figure 7:
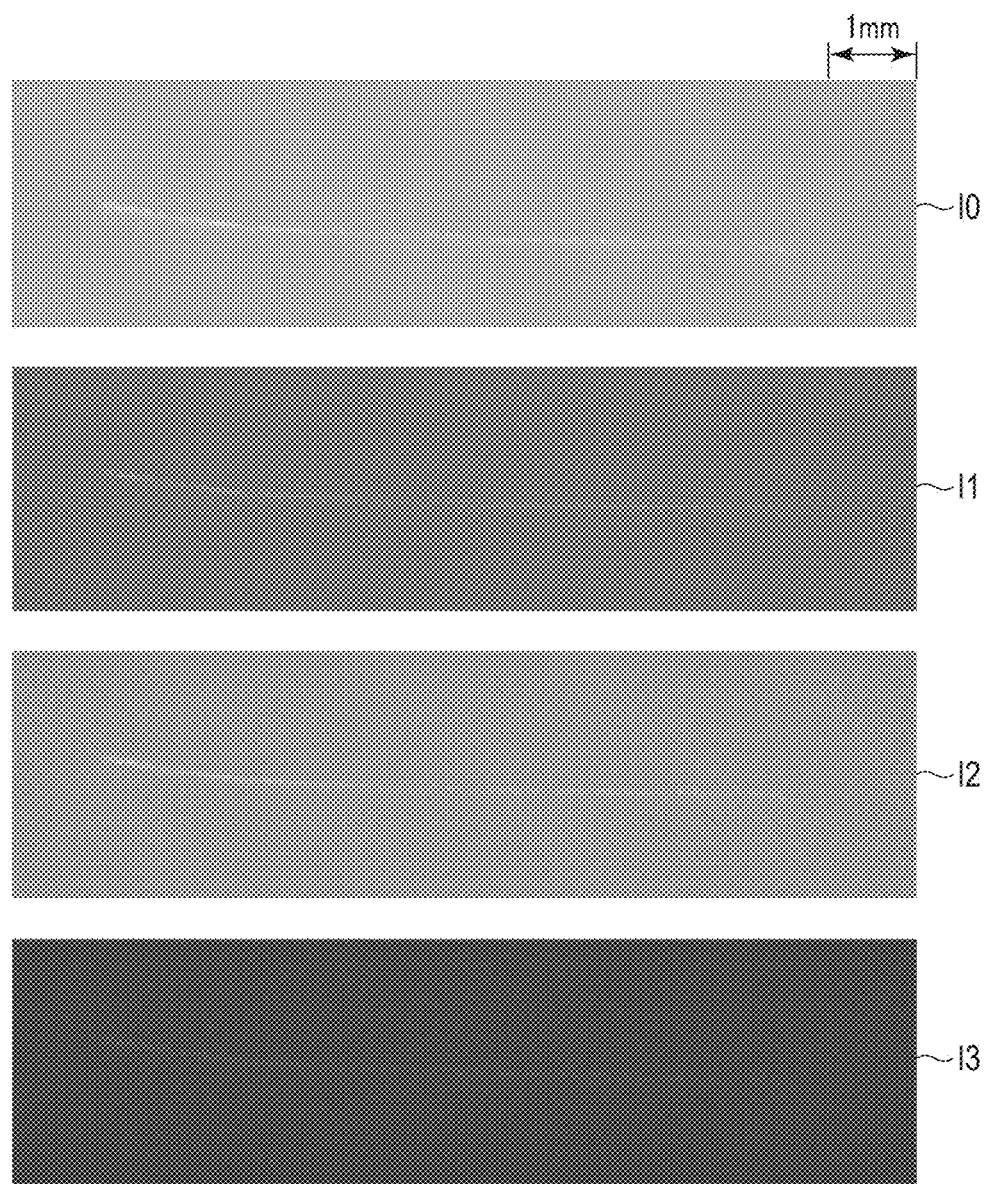
FIG. 7 is an image showing RGB image data, R image data, G image data, and B image data captured by a normal camera under ambient light.

FIG. 7 illustrates, as comparison targets, RGB image data I0, R image data I1, G image data I2, and B image data I3 obtained by capturing the same subject S from the same position with a normal camera. That is, the RGB image data I0, the R image data I1, the G image data I2, and the B image data I3 illustrated in FIG. 7 are images captured by the imaging unit 14 without passing through the color filter 34 of the optical inspection apparatus 4.

The RGB image data I0 is acquired as a color reflecting the color of the subject S. In addition, in the R image data I1, only red is extracted from the color of the subject S. In the G image data I2, only green is extracted from the color of the subject S. In the B image data I3, only blue is extracted from the color of the subject S. That is, the R image data I1, the G image data I2, and the B image data I3 are images based on spectrum information of the subject.

On the other hand, the RGB image data Irgb captured by the optical inspection apparatus 4 according to the present embodiment is different in color from the RGB image data I0 of the subject S captured by a normal camera that does not pass through the color filter 34. This is because, in the RGB image data Irgb captured by the optical inspection apparatus 4 according to the present embodiment, the wavelength of the R light, the wavelength of the B light, and the wavelength of the G light are selectively transmitted through the color filter 34, and not the color information but the direction information of the light beam is acquired by the imaging unit 14.

As described above, note that the light beam intensities of the R image data Ir, the G image data Ig, and the B image data Ib acquired by the respective pixels of the imaging unit 14 of the optical inspection apparatus 4 according to the present embodiment change complementarily. That is, when the light beam intensity of the R light is increased among the light beams passing through the color filter 34, the light beam intensity of the G light and the light beam intensity of the B light are weakened in a certain pixel. In addition, in another certain pixel, when the light beam intensity of the B light is increased, the light beam intensity of the R light and the light beam intensity of the G light are weakened.

On the other hand, in the R image data I1, the G image data I2, and the B image data I3 of the subject S captured by a normal camera that do not pass through the color filter 34, the light beam intensity of the R light, the light beam intensity of the G image, and the light beam intensity of the B light in a certain pixel only change depending on the color of the subject, and there is no complementary relationship described above.

Next, processing of extracting feature portions such as the abnormal portion S2 and the edge portion S3 with respect to each of the image data Ir, Ig, and Ib illustrated in FIG. 6 using the processor 18 will be described with reference to the flowchart illustrated in FIG. 8. In the present embodiment, an example of processing of extracting the abnormal portion S2 with respect to the standard surface S1 as a feature portion will be described.

When causing the imaging unit 14 to acquire image data, the processor (processing circuit) 18 reads the relationship between the optical axis C of the image forming optical system 32 and the color filter 34 from the storage medium 20. From the relationship between the optical axis C of the image forming optical system 32 and the color filter 34, the processor 18 recognizes the B image data Ib acquired by the imaging unit 14 as an image of specular reflection light, recognizes the G image data Ig acquired by the imaging unit 14 as an image of scattering light at the first scattering angle θg (<θr) from the subject S, and recognizes the R image data Ir acquired by the imaging unit 14 as an image of scattering light at the second scattering angle θr from the subject S (step ST11).

Then, the processor 18 selects an appropriate image filter for each piece of image data from the image filter program illustrated in FIG. 5, and convolutes the same or different image filters with respect to the R image data Ir, the G image data Ig, and the B image data Ib (step ST12).

As an example, the processor 18 spatially differentiates each of the R image data Ir, the G image data Ig, and the B image data Ib based on the image filter program, and extracts a portion having a large change in pixel value between adjacent pixels.

Then, the processor 18 compares at least two of the R image data, the G image data, and the B image data obtained by convoluting the image filter (step ST13). The processor 18 may compare the R image data, the G image data, and the B image data obtained by convoluting the image filter.

Figure 9:
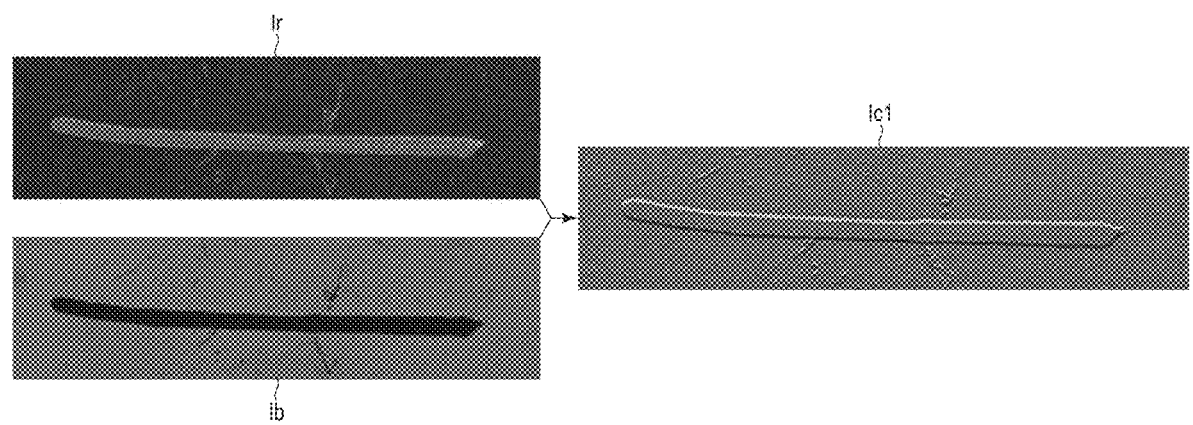
FIG. 9 is a schematic diagram illustrating a state in which calculated image data is output from R image data and B image data using the flowchart illustrated in FIG. 8.

Then, the processor 18 obtains calculated image data Ic1 illustrated in FIG. 9 by subtracting the B image data obtained by convoluting the image filter from the R image data obtained by convoluting the image filter (ST13). That is, the processor 18 performs arithmetic processing of convoluting an image filter with respect to the B image data (information of the first image) Ib and the R image data (information of the second image) Ir, and then performs the four arithmetic processing on the B image data Ib and the R image data Ir. The calculated image data Ic1 indicates the unevenness information of the subject S. The processor 18 determines whether the subject S (for example, a plastic plate) is a non-defective product or a defective product according to the size of the unevenness. Whether the subject S is a non-defective product or a defective product, and the threshold of the size and height of the unevenness can be appropriately set.

Then, pixel values in two pixels in a proximal relationship (for example, an adjacent relationship) of the imaging unit 14 have a strong correlation. Therefore, pixel values of pixels having such a proximal relationship may be compared in a necessary region instead of all pixels. In this case, for example, by extracting pixel values of pixels having a proximal relationship in one piece of image data, extracting pixel values of pixels having a proximal relationship in another piece of image data, and comparing the extracted pixel values between the pieces of image data, the feature of the unevenness of the subject S can be accurately extracted. Conversely, pixel values in two pixels in a distal relationship have weak correlation. Therefore, it is considered that the feature of the unevenness information of the subject S is more strongly expressed by extracting and comparing the pixel values of the proximal pixels than by extracting and comparing the pixel values of the pixels having a distal relationship.

In the example illustrated in FIG. 9, an example of obtaining the calculated image data Ic1 using the R image data Ir and the B image data Ib was described. The calculated image data Ic1 may be obtained using the G image data Ig and the B image data Ib.

In the present embodiment, an example was described in which the same or different image filters are convoluted with respect to the R image data Ir, the G image data Ig, and the B image data Ib in step ST12 of the flowchart illustrated in FIG. 8. Step ST12 may be omitted. That is, the processing of step ST13 may be performed without performing the processing of steps ST11 to ST12. In this case, in the example illustrated in FIG. 10, the B image data Ib is subtracted from the R image data Ir to obtain calculated image data Ic2. In the R image data Ir illustrated in FIG. 10, the pixel value based on the image of the R light at the position corresponding to the abnormal portion S2 is negligibly large as compared with the pixel value based on the image of the B light in the B image data Ib. Therefore, in the calculated image data Ic2 illustrated in FIG. 10, it is assumed that most of the pixel values based on the image of the R light at the position corresponding to the abnormal portion S2 remain. The difference between the pixel value based on the image of the R light at the position corresponding to the standard surface S1 in the R image data Ir and the pixel value based on the image of the B light at the position corresponding to the standard surface S1 in the B image data Ib is very small as compared with the difference between the pixel value based on the image of the R light and the pixel value based on the image of the B light at the position corresponding to the abnormal portion S2. Therefore, in the calculated image data Ic2, the position corresponding to the abnormal portion S2 has a clearly larger pixel value than the position corresponding to the standard surface S1. The calculated image data Ic2 indicates the unevenness information of the subject S. The processor 18 determines whether the subject S (plastic plate) is a non-defective product or a defective product according to the magnitude of the difference between the pixel value of the region around a certain pixel and the pixel value of the region around another certain pixel. Whether the subject S is a non-defective product or a defective product, and the threshold of the magnitude of the difference between the pixel values can be appropriately set.

Figure 10:
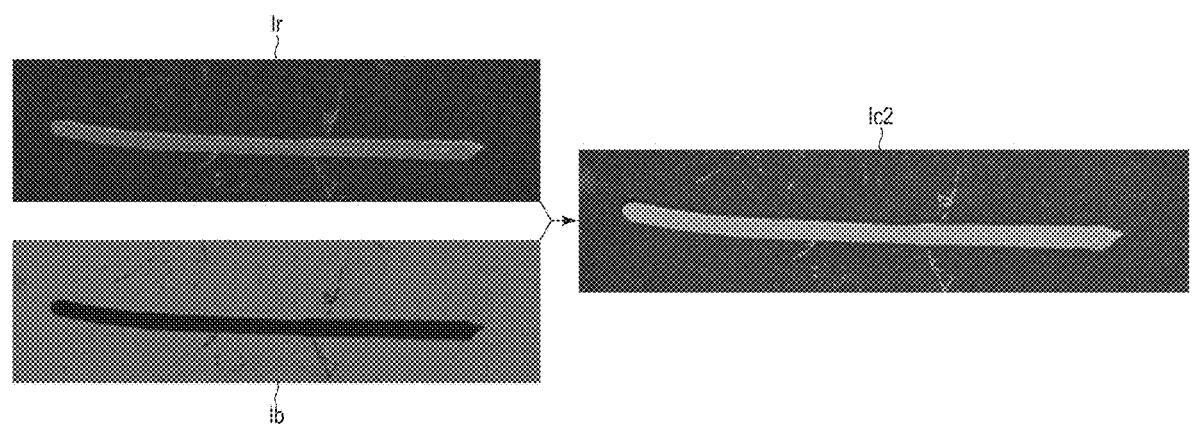
FIG. 10 is a schematic diagram illustrating a state in which calculated image data is output from R image data and B image data using the flowchart illustrated in FIG. 8 except for a part of the flowchart.

Note that in FIGS. 9 and 10, the example in which the B image data is subtracted from the R image data was described. The image processing of the optical inspection can be performed even if division is performed instead of subtraction.

Figure 11:
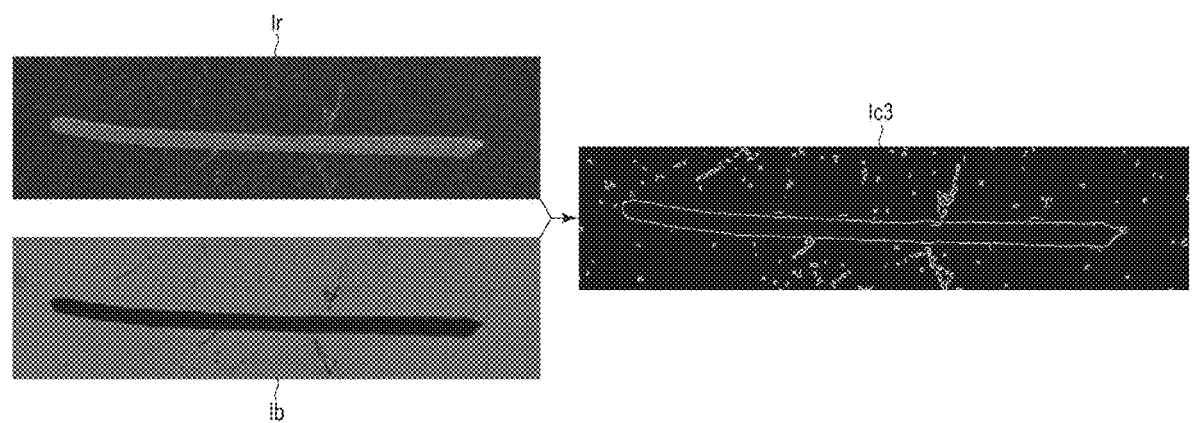
FIG. 11 is a schematic diagram illustrating a state in which calculated image data is output from R image data and B image data by changing the order of a part of the flowchart illustrated in FIG. 8.

In FIG. 11, after adding the R image data Ir and the B image data Ib, the processor 18 selects an appropriate program from the image filter program (see FIG. 5) and performs contour enhancement processing to obtain calculated image data Ic3. In this case, for example, before performing the arithmetic processing in which the image filter is convoluted with respect to the B image data (information of the first image) Ib and the R image data (information of the second image) Ir, the processor 18 performed the four arithmetic processing such as addition with respect to the B image data (information of the first image) Ib and the R image data (information of the second image) Ir. That is, the order of steps ST12 and ST13 may be opposite.

The edge portion S3 is obtained as the G image data Ig. Therefore, when the R image data Ir and the B image data Ib are added, the position corresponding to the edge portion S3 of the calculated image data becomes a black image. In addition, when the R image data Ir and the B image data Ib are added, the pixel value at the position corresponding to the standard surface S1 of the calculated image data and the pixel value at the position corresponding to the abnormal portion S2 are added. Therefore, the position corresponding to the standard surface S1 and the position corresponding to the abnormal portion S2 of the calculated image data are obtained as bright portions opposite to black. Therefore, when the contour enhancement processing is performed on the calculated image data as the image processing, the calculated image data Ic3 is obtained as an image in which a position corresponding to the edge portion S3 is enhanced. Note that the pixel value of the calculated image data when the pixel value of the R image data Ir and the pixel value of the B image data Ib at the position corresponding to the standard surface S1 are added is significantly smaller than the pixel value of the calculated image data when the pixel value of the R image data Ir and the pixel value of the B image data Ib at the position corresponding to the abnormal portion S2 are added. Therefore, fine scratches on the standard surface S1 are emphasized by the contour enhancement processing similarly to the position corresponding to the edge portion S3. Therefore, the calculated image data Ic3 indicates the unevenness information of the position corresponding to the edge portion S3 of the subject S. The processor 18 determines whether the subject S (plastic plate) is a non-defective product or a defective product according to the magnitude of the difference between the pixel value of the portion where the contour is emphasized in the calculated image data Ic3 and the pixel value of the other black portion regions. Note that, in the calculated image data Ic3, the position corresponding to the abnormal portion S2 is not included as a region where the contour is emphasized. This means that almost no edge portion S3 is included in the position itself corresponding to the abnormal portion S2 according to the present embodiment.

Note that in FIG. 11, an example of adding the R image data and the B image data was described. The image processing of the optical inspection can be performed even if multiplication is performed instead of addition.

In addition, for example, the B image data Ib is an image of specular reflection light. Therefore, the processor 18 adopts, for example, a median filter that emphasizes flatness or a low-pass filter (first image filter) by Fourier transformation as an image filter program for the B image data Ib. When, for example, a low-pass filter is used as the image filter program, the processor 18 passes information of each position where a change in the pixel value is small and cuts information of each position where a change in the pixel value is large.

For example, the R image data Ir is an image of scattering light at the second scattering angle θr. Therefore, the processor 18 adopts, for example, a high-pass filter or a Sobel filter (second image filter) by Fourier transformation as the image filter program, and performs, for example, processing of emphasizing the contour of each position where the change in the pixel value in the R image data Ir is large. When, for example, a high-pass filter is used as the image filter program, the processor 18 passes information of each position where a change in the pixel value is large and cuts information of each position where a change in the pixel value is small.

The G image data Ig is an image of scattering light at the first scattering angle θg. Therefore, in the G image data Ig, as with the R image data Ir, the processor 18 adopts, for example, a high-pass filter or a Sobel filter by high-frequency Fourier transformation as the image filter program, and performs, for example, processing of emphasizing the contour of each position in the G image data Ig. When, for example, a high-pass filter is used as the image filter program, the processor 18 passes information of each position where a change in the pixel value is large and cuts information of each position where a change in the pixel value is small.

In this manner, the processor 18 may perform arithmetic processing in which the first image filter is convoluted with respect to the B image data (information of the first image) Ib, and perform arithmetic processing in which the second image filter different from the first image filter is convoluted with respect to the R image data (information of the second image) Ir or the G image data (information of the third image) Ig. In this case, the processor 18 reduces, for example, the edge information and the like from the B image data Ib, and amplifies the edge information and the like from the R image data Ir or the G image data Ig, in a manner that the uneven state of the surface of the subject S can be more easily extracted.

The processor 18 can also inspect the surface state of the subject S by such processing.

Note that the color filter 34 emits G light (light beam of the third wavelength) having a wavelength different from those of the B light (light beam of the first wavelength) and the R light (light beam of the second wavelength) toward the imaging unit 14 according to the light beam direction from the subject S in a manner that the light beam intensity of the B light, the light beam intensity of the R light, and the light beam intensity of the G light have a complementary relationship, and causes the imaging unit 14 to acquire the B image data (information of the first image) Ib, the R image data (information of the second image) Ir, and the G image data (information of the third image related to the light beam of the third wavelength) Ig. In addition, the processor 18 extracts the unevenness information of the subject S by comparing at least two pieces of information of the B image data (information of the first image) Ib, the R image data (information of the second image) Ir, and the G image data (information of the third image) Ig.

In addition, for example, it is assumed that the subject S is not scratched (abnormal portion S2) but contaminated. At this time, the RGB image data I0, the R image data I1, the G image data I2, and the B image data I3 of the subject S captured by a normal camera that do not pass through the color filter 34 extract color information for the contamination. On the other hand, in the RGB image data Irgb, the R image data Ir, the G image data Ig, and the B image data Ib captured by the optical inspection apparatus 4 according to the present embodiment, if the contamination is not a scratch (abnormal portion S2), the information of the contaminated portion is not reflected in the image. Therefore, the processor 18 of the optical inspection apparatus 4 according to the present embodiment can output whether or not the abnormal portion S2 of the subject S may cause a problem when the subject S becomes a product, ignoring simple contamination on the subject S. Therefore, according to the present embodiment, the optical inspection of the subject S can be performed with higher accuracy than before by comparing the R image data Ir, the G image data Ig, and the B image data Ib.

As described above, according to the present embodiment, it is possible to provide an optical inspection method, the optical inspection program 20a, and the optical inspection apparatus 4 for inspecting the surface state of the subject S by acquiring an image including information related to a light beam direction from the subject S and performing image processing on the image.

Note that the processor 18 described above can appropriately use the four arithmetic processing (addition, subtraction, multiplication, and division processing) when executing the optical inspection program 20a.

In addition, the processor 18 described above can perform image filter processing on at least one of R image data Ir, G image data Ig, and B image data Ib when executing the optical inspection program 20a. In the image filter processing, not only one image filter program but also a plurality of image filter programs may be executed on certain image data to obtain desired calculated image data.

In addition, when executing the optical inspection program 20a, the processor 18 described above can appropriately set the order of the four arithmetic processing of the R image data Ir, the G image data Ig, and the B image data Ib and the image filter processing according to the target calculated image data.

In the present embodiment, it was described that the standard surface S1 of the subject S is a flat surface. The standard surface S1 of the subject S may not actually be a flat surface, such as a curved surface. The optical inspection system 2 according to the present embodiment can perform optical inspection on a portion that can be viewed as a plane by enlarging the subject S and the like.

Second Embodiment

A second embodiment will be described with reference to FIGS. 12 to 14. The second embodiment is a modification of the first embodiment, and the same members or members having the same functions as the members described in the first embodiment are denoted by the same reference numerals as much as possible, and a detailed description will be omitted.

Figure 12:
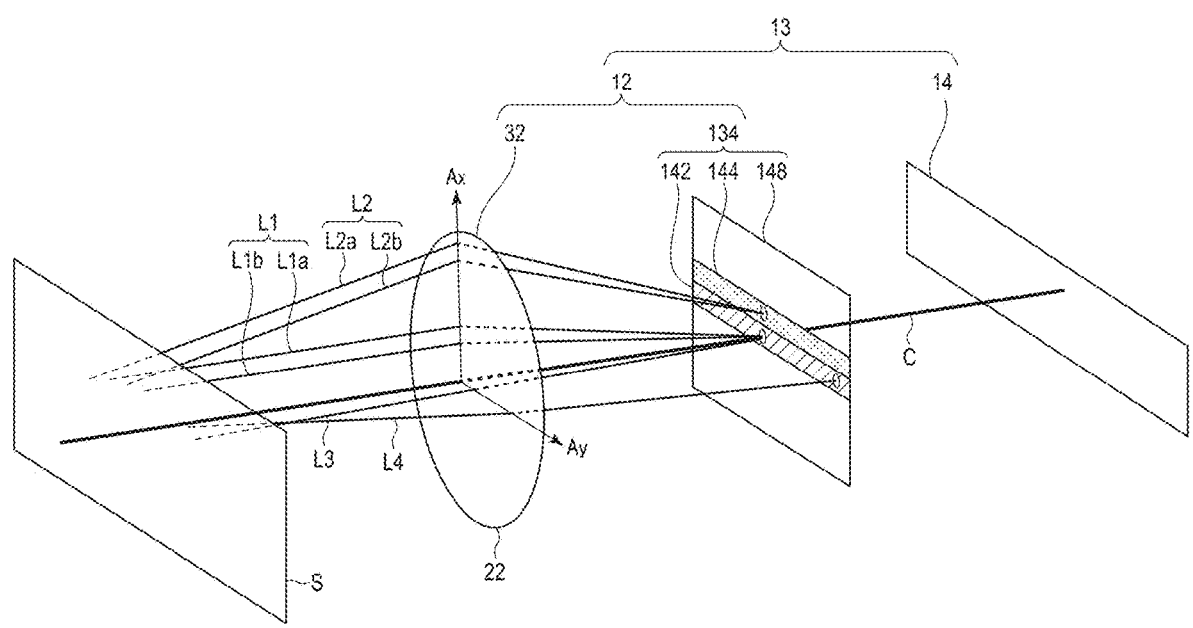
FIG. 12 is a schematic perspective view illustrating a part of an optical inspection apparatus of an optical inspection system according to the second embodiment.

As illustrated in FIG. 12, an optical apparatus 12 of an optical inspection apparatus 4 includes an image forming optical system (image forming lens) 32 and a color filter (multi-wavelength aperture) 134.

Here, an example was described in which the color filter 34 of the optical apparatus 12 of the optical inspection apparatus 4 according to the first embodiment is to be rotated with respect to the optical axis C, that is, isotropic. In the present embodiment, an example in which the color filter 134 is anisotropic will be described.

The color filter 134 is formed in, for example, a rectangular shape having one direction (direction parallel to a second axis Ay to be described later) orthogonal to the optical axis C as a longitudinal direction. In the present embodiment, the color filter 134 selectively passes a first wavelength and a second wavelength different from the first wavelength. The color filter 134 includes a first wavelength selection filter (wavelength selection region) 142 and a second wavelength selection filter (wavelength selection region) 144. Note that the periphery of the first wavelength selection filter 142 and the second wavelength selection filter 144 of the color filter 134 includes a light beam shielding unit 148. The light beam shielding unit 148 is formed of, for example, a black plate, and holds the first wavelength selection filter 142 and the second wavelength selection filter 144.

Here, in the present embodiment, a first axis Ax is taken to be orthogonal to the optical axis C of the image forming optical system 32. In the present embodiment, the axial direction of the first axis Ax coincides with the direction in which the first wavelength selection filter 142 and the second wavelength selection filter 144 are arranged. That is, the first wavelength selection filter 142 and the second wavelength selection filter 144 are disposed to be shifted in the axial direction of the first axis Ax. In the present embodiment, a second axis Ay is taken in a direction orthogonal to both the first axis Ax and the optical axis C. In the present embodiment, the axial direction of the second axis Ay is along the longitudinal direction of the color filter 134.

Each of the first wavelength selection filter 142 and the second wavelength selection filter 144 is formed along the longitudinal direction of the color filter 134. The first wavelength selection filter 142 is disposed, for example, on the optical axis C. The first wavelength selection filter 142 is adjacent to the second wavelength selection filter 144. The first wavelength selection filter 142 and the second wavelength selection filter 144 of the color filter 134 are formed to be translationally symmetric with respect to an axis parallel to the second axis Ay.

The first wavelength selection filter 142 passes a light beam (first light beam) having a first wavelength. For example, the first wavelength is B light having blue light (435.8 nm) and a first wavelength in the vicinity. The second wavelength selection filter 144 passes a light beam having a second wavelength (second light beam). The second wavelength is R light having red light (700 nm) and a second wavelength in the vicinity. Note that the first wavelength selection filter 142 shields a light beam having a wavelength (including the second wavelength) different from the first wavelength. The second wavelength selection filter 144 shields a light beam having a wavelength (including the first wavelength) different from the second wavelength.

Image capturing by the imaging unit 14 may use an area sensor or a line sensor. In addition, the imaging unit 14 may include three color channels of R, G, and B in each pixel. Here, as illustrated in FIG. 12, the imaging unit 14 is an area sensor, and each pixel includes two color channels of red and blue. That is, the imaging unit 14 can receive the B light and the R light in independent color channels.

In the present embodiment, as illustrated in FIG. 12, the optical inspection apparatus 4 does not include a light source 16 and a half mirror 36. If the subject S can be imaged using a camera 13, the light source 16 and the half mirror 36 are not necessarily required. Of course, the optical inspection apparatus 4 may include the light source 16 and the half mirror 36.

A plane formed by the first axis Ax and the optical axis C is a first plane (virtual plane), and a plane formed by the second axis Ay and the optical axis C is a second plane (virtual plane). FIG. 13 is a cross-sectional view of the optical inspection apparatus 4 along the first plane. FIG. 14 is a cross-sectional view of the optical inspection apparatus 4 along the second plane.

Figure 13:
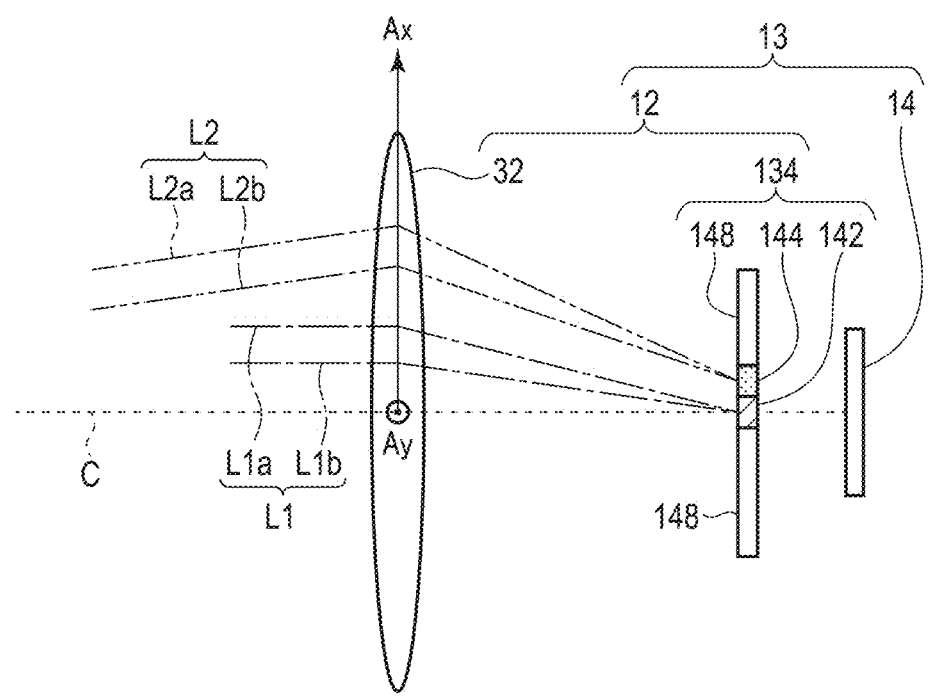
FIG. 13 is a schematic cross-sectional view of the optical inspection apparatus of the optical inspection system illustrated in FIG. 12 as viewed from a first plane including an optical axis.

As illustrated in FIGS. 12 and 13, among the light beams from the subject S, a light beam parallel to the optical axis C and in the first plane is a first light beam group L1. Two light beams of a first light beam L1a and a first light beam L1b are considered as a representative of the first light beam group L1. Of the light beams from the object side, a light beam in a direction inclined with respect to the optical axis C and in the first plane is a second light beam group L2. Two light beams of a second light beam L2a and a second light beam L2b are considered as a representative of the second light beam group L2.

Figure 14:
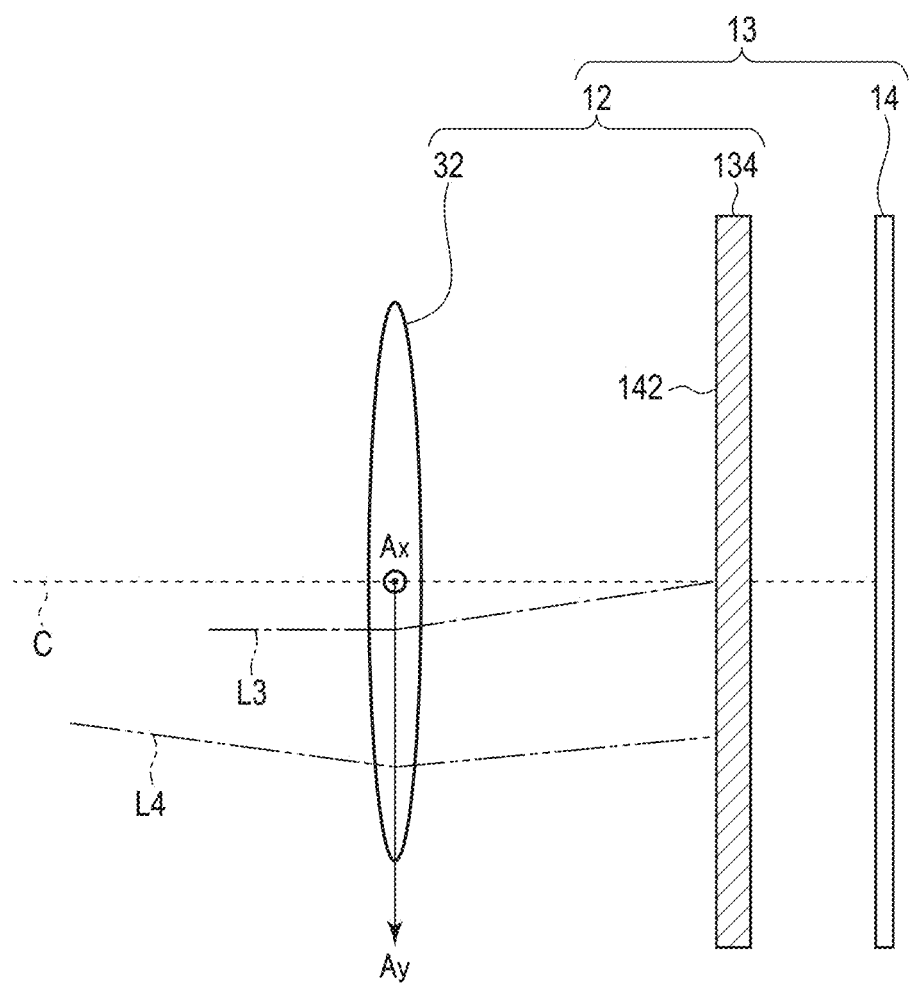
FIG. 14 is a schematic cross-sectional view of the optical inspection apparatus of the optical inspection system illustrated in FIG. 12 as viewed from a second plane including an optical axis.

As illustrated in FIGS. 12 and 14, among the light beams from the object side, a light beam parallel to the optical axis C and in the second plane is a third light beam group. A third light beam L3 is considered as a representative of the third light beam group. Of the light beams from the object side, a light beam in a direction inclined with respect to the optical axis C and in the second plane is a fourth light beam group. A fourth light beam L4 is considered as a representative of the fourth light beam group.

As illustrated in FIGS. 12 and 13, a plane parallel to the first plane simultaneously intersects the first wavelength selection filter 142 and the second wavelength selection filter 144 of the color filter 134. That is, a plane parallel to the first plane intersects at least two different wavelength selection filters 142 and 144 of the color filter 134. As illustrated in FIGS. 12 and 14, a plane parallel to the second plane intersects one wavelength selection filter 142 of the color filter 134. That is, since the number of color filters 134 intersecting the wavelength selection filters 142 and 144 of the color filter 134 is different between the first plane and the second plane, the color filter is anisotropic. In other words, in the color filter 134, the distribution of the wavelength selection filters 142 and 144 varies depending on the directions of the first axis Ax and the second axis Ay, and is anisotropic.

In the optical system in which an image of the light beam from the object point O of the subject S is formed at the image point by the image forming optical system 32, generally, an optical system in which the principal light beam is parallel to the optical axis C on the object side is referred to as an object-side telecentric optical system. In the present embodiment, when an image of the light beam substantially parallel to the optical axis C on the object side is formed by the image forming optical system 32, it is determined that the light beam has object side telecentricity. On the other hand, when an image of the light beam that is not substantially parallel to the optical axis C on the object side and is inclined is formed by the image forming optical system 32, it is determined that the light beam has object-side non-telecentricity.

The light beams L1a and L1b of the first light beam group from the object side are parallel to the optical axis C. The light beams L1a and L1b reach the focal point of the focal plane of the image forming optical system 32. Therefore, the first light beams L1a and L1b reach the first wavelength selection filter 142 of the color filter 134 placed on the focal plane. That is, the first light beams L1a and L1b having telecentricity in the first plane reach the first wavelength selection filter 142.

The light beams L2a and L2b of the second light beam group from the object side are inclined with respect to optical axis C in the first plane. The light beams L2a and L2b of the second light beam group are out of focal point on the focal plane of the image forming optical system 32 and reach, for example, the second wavelength selection filter 144. That is, the second light beams L2a and L2b reach the second wavelength selection filter 144. That is, the light beams L2a and L2b having the non-telecentricity in the first plane reach the second wavelength selection filter 144.

A part of the light beam on the object side inclined with respect to the optical axis C in the first plane reaches the second wavelength selection filter 144 and also reaches the light beam shielding unit 148.

The light beam L3 of the third light beam group from the object side is parallel to optical axis C in the second plane. The light beam L3 of the third light beam group reaches the focal point of the focal plane of the image forming optical system 32. Therefore, the third light beam L3 reaches the first wavelength selection filter 142 of the color filter 134 placed on the focal plane. That is, the light beam L3 having telecentricity in the second plane reaches the first wavelength selection filter 142.

The light beam L4 of the fourth light beam group from the object side is inclined with respect to optical axis C in the second plane. The light beam L4 of the fourth light beam group reaches the first wavelength selection filter 142 that is out of focal point on the focal plane of the image forming optical system 32. That is, the fourth light beam L4 reaches the first wavelength selection filter 142. That is, the light beam having the non-telecentricity in the second plane reaches the first wavelength selection filter 142.

Note that the light beam on the object side inclined with respect to the optical axis C in the second plane does not reach the light beam shielding unit 148.

As described above, in the first plane, the light beams L1a and L1b having telecentricity and the light beams L2a and L2b having non-telecentricity reach different wavelength selection regions. On the other hand, in the second plane, the light beam L3 having telecentricity and the light beam L4 having non-telecentricity both reach the same wavelength selection filter 142.

Regarding an arbitrary light beam reaching the image forming optical system 32 from the object side in an arbitrary direction, the path is projected onto the first plane (see FIGS. 12 and 13) and the path is projected onto the second plane (see FIGS. 12 and 14). The properties described above are similarly established for the projected light beams. That is, the light beam having telecentricity and the light beam having non-telecentricity, which are the light beams projected on the first plane, reach different wavelength selection regions of the color filter 134. On the other hand, both the light beam having telecentricity and the light beam having non-telecentricity, which are the light beams projected on the second plane, reach the same wavelength selection filter 142.

In a case where the imaging unit 14 of the optical inspection apparatus 4 of the present embodiment captures the B light (light beam of the first wavelength) of the object, that is, in a case where the B image data Ib is obtained, the first wavelength selection filter 142 of the color filter 134 emits the B light toward the imaging unit 14. At this time, the first wavelength selection filter 142 of the color filter 134 shields the R light (light beam of the second wavelength). The B light has telecentricity in the axial direction of the first axis Ax. Therefore, the optical inspection apparatus 4 can acquire the B image data Ib having telecentricity by the imaging unit 14. An image having telecentricity has a property of not depending on the perspective of an object. As a result, the actual size of the object can be acquired with respect to the axial direction of the first axis Ax. On the other hand, the B light has non-telecentricity in the axial direction of the second axis Ay. This can also be rephrased as having entocentricity. That is, it is possible to acquire an entocentric image having a wide angle of view in the axial direction of the second axis Ay and having perspective.

In a case where the imaging unit 14 of the optical inspection apparatus 4 captures the R light (light beam of the second wavelength) of the object, that is, in a case where the R image data Ir is obtained, the second wavelength selection filter 144 of the color filter 134 emits the R light toward the imaging unit 14. At this time, the second wavelength selection filter 144 of the color filter 134 shields the B light (light beam of the first wavelength). The R light has non-telecentricity in both the axial direction of the first axis Ax and the axial direction of the second axis Ay. This can also be rephrased as having entocentricity. That is, the optical inspection apparatus 4 can acquire an entocentric image of the R light by the imaging unit 14. Thus, the optical inspection apparatus 4 can acquire an image having a large angle of view.

As described above, the imaging unit 14 of the optical inspection apparatus 4 according to the present embodiment simultaneously acquires images of the B light (for example, corresponding to specular reflection light) and the R light (for example, corresponding to scattering light) along the direction of the first axis Ax.

As described above, the color filter 134 provided on the focal plane of the image forming optical system 32 between the image forming optical system 32 and the imaging unit 14 emits the light beam (for example, the B light) having the first wavelength and the light beam (for example, the R light) having the second wavelength different from the first wavelength toward the imaging unit 14 according to the light beam direction from the subject S. Then, the color filter 134 causes the imaging unit 14 to acquire information of the first image related to the first wavelength and information of the second image related to the light beam of the second wavelength. At this time, the imaging unit 14 simultaneously acquires images of the light beams having the first wavelength and the second wavelength that passed through the color filter 134.

Note that the light beam intensities of the R image data Ir and the B image data Ib acquired by the respective pixels of the imaging unit 14 of the optical inspection apparatus 4 according to the present embodiment change complementarily. That is, in a certain pixel, when the light beam intensity of the R light is increased among the light beams passing through the color filter 134, the light beam intensity of the B light is weakened in the same certain pixel. In addition, when the light beam intensity of the B light is increased in another certain pixel, the light beam intensity of the R light is weakened in another certain pixel.

The image processing flow of extracting the feature portion such as the abnormal portion S2 with respect to the standard surface S1 can be performed along the flowchart illustrated in FIG. 8 described in the first embodiment. Therefore, the description of the image processing flow here will be appropriately omitted.

First, when causing the imaging unit 14 to acquire image data, the processor (processing circuit) 18 reads the relationship between the optical axis C of the image forming optical system 32 and the color filter 34 from the storage medium 20 (step ST11).

In the case of the present embodiment, the color filter 134 includes the first wavelength selection filter 142 and the second wavelength selection filter 144. The processor 18 recognizes that image processing is performed on information of two wavelengths (R image data Ir and B image data Ib). From the relationship between the optical axis C of the image forming optical system 32 and the color filter 34, the processor 18 recognizes that the B image data Ib acquired by the imaging unit 14 is an image of specular reflection light from the standard surface S1 of the subject S, and recognizes that the R image data Ir acquired by the imaging unit 14 is an image of scattering light from the abnormal portion S2 of the subject S.

Therefore, for the specular reflection light component from the surface of the subject S, the imaging unit 14 acquires an image as the B image data of the B light. When there is an abnormal portion S2 such as a foreign substance or fine unevenness on a scale close to the wavelength of light on the surface of the subject S, the light beam from the abnormal portion S2 is scattered, and the imaging unit 14 acquires an image as R image data of the R light.

As described in the first embodiment, the processor 18 performs the convolution processing of the image filter (ST12) and the comparison processing of the B image data and the R image data (ST13) to obtain the unevenness information of the subject S (ST14).

As described above, according to the present embodiment, it is possible to provide an optical inspection method, the optical inspection program 20a, and the optical inspection apparatus 4 for inspecting the surface state of the subject S by acquiring an image including information related to a light beam direction from the subject S and performing image processing on the image.

Also in the example according to the present embodiment, it is not always necessary to convolute the image filter with respect to the image data. That is, step ST12 can be omitted as appropriate. In addition, the order of steps ST12 and ST13 can be switched as appropriate.

In the present embodiment, the standard surface S1 of the subject S may not be a flat surface such as a curved surface. The optical inspection system 2 according to the present embodiment can perform optical inspection on a portion that can be viewed as a plane by enlarging the subject S and the like.

In the present embodiment, the light beam to be passed through the first wavelength selection filter 142 is the B light, and the light beam to be shielded is the R light. The light beam passed through the second wavelength selection filter 144 was the R light, and the light beam to be shielded was the B light. The light beam to be passed through the first wavelength selection filter 142 may be the R light, the light beam to be shielded may be the B light, the light beam to be passed through the second wavelength selection filter 144 may be the B light, and the light beam to be shielded may be the R light.

In the present embodiment, the first wavelength selection filter 142 and the second wavelength selection filter 144 of the two colors of the color filter 134 exclude the wavelength of the G light, which is the wavelength of the green light (546.1 nm) and the wavelength in the vicinity. This is because the overlapping portion of the wavelengths of the B light and the G light and the overlapping portion of the wavelengths of the G light and the R light are larger than the overlapping portion of the wavelengths of the B light and the R light.

Since the wavelength of the G light is between the wavelength of the B light and the wavelength of the R light, it is easier to separate the wavelength of the B light and the wavelength of the R light than using the wavelength of the G light. The range of the first wavelength and the range of the second wavelength are not limited to the above-described wavelengths as long as they are different from each other, and may be any. In addition, it is assumed that spectrum of light beams passing through different wavelength selection regions of the color filter 134 are different. Different spectra have different hues.

In the present embodiment, an example of using the imaging unit 14 including an appropriate wavelength range such as B light and R light was described. By using a multispectral camera or a hyperspectral camera as the imaging unit 14, it is possible to obtain an image by separating colors for each appropriate wavelength (for example, a wavelength of 5 nm in the case of a hyperspectral camera) in the wavelength region of visible light of 400 nm to 760 nm, for example. Therefore, by using the multispectral camera or the hyperspectral camera as the imaging unit 14 as described above, the information of the object plane can be acquired. In this case, the color filter 134 may be divided into not only the two wavelength selection filters 142 and 144 but also a large number of filters.

According to at least one embodiment described above, it is possible to provide an optical inspection method, an optical inspection program, and an optical inspection apparatus for inspecting a surface state of a subject by acquiring an image including information related to a light beam direction from the subject and performing image processing on the image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection method comprising:
    emitting a light beam having a first wavelength and a light beam having a second wavelength different from the first wavelength in a single direction toward an imaging unit in accordance with light beam directions from a subject, with a light beam intensity of the first wavelength and a light beam intensity of the second wavelength being in a complementary relationship, and acquiring image data including information of a first image related to the light beam having the first wavelength and information of a second image related to the light beam having the second wavelength with the imaging unit; and
    comparing the information of the first image and the information of the second image to extract unevenness information of the subject,
    wherein the complementary relationship is a relationship in a certain pixel of the imaging unit, in which:
        when the light beam intensity of the first wavelength is increased, the light beam intensity of the second wavelength is weakened in the same certain pixel, or
        when the light beam intensity of the second wavelength is increased, the light beam intensity of the first wavelength is weakened in the same certain pixel.

2. The optical inspection method according to claim 1, further comprising:
    performing arithmetic processing of convoluting an image filter with respect to at least one of the information of the first image and the information of the second image.

3. The optical inspection method according to claim 2, wherein
    when the arithmetic processing of convoluting the image filter is performed with respect to the information of the first image and the information of the second image, the performing the arithmetic processing of convoluting the image filter includes:
    performing the arithmetic processing of convoluting a first image filter with respect to the information of the first image, and
    performing the arithmetic processing of convoluting a second image filter different from the first image filter with respect to the information of the second image.

4. The optical inspection method according to claim 3, wherein
    the performing the arithmetic processing of convoluting the first image filter includes performing image filter processing of emphasizing flatness of an image as the first image filter with respect to the information of the first image, and
    the performing the arithmetic processing of convoluting the second image filter includes performing image filter processing of enhancing a contour of an image as the second image filter with respect to the information of the second image.

5. A non-transitory storage medium storing an optical inspection program, the optical inspection program causing a computer to implement:
    by using an optical apparatus configured to emit a light beam having a first wavelength and a light beam having a second wavelength different from the first wavelength in a single direction toward an imaging unit in accordance with a light beam direction from a subject, with a light beam intensity of the first wavelength and a light beam intensity of the second wavelength being in a complementary relationship, acquiring image data including information of a first image related to the first wavelength and information of a second image related to the light beam having the second wavelength with the imaging unit,
    separating the image data into the information of the first image and the information of the second image,
    comparing the information of the first image and the information of the second image, and
    extracting unevenness information of the subject,
    wherein the complementary relationship is a relationship in a certain pixel of the imaging unit, in which:
        when the light beam intensity of the first wavelength is increased, the light beam intensity of the second wavelength is weakened in the same certain pixel, or
        when the light beam intensity of the second wavelength is increased, the light beam intensity of the first wavelength is weakened in the same certain pixel.

6. An optical inspection apparatus comprising:
    an image forming optical system that forms an image of a light beam from a subject;
    an imaging unit provided on an image forming plane of the image forming optical system;
    a color filter that is provided on a focal plane of the image forming optical system between the image forming optical system and the imaging unit,
    the color filter being configured to:
        emit a light beam having a first wavelength and a light beam having a second wavelength different from the first wavelength in a single direction toward the imaging unit in accordance with a light beam direction from the subject in a state in which a light beam intensity of the first wavelength and a light beam intensity of the second wavelength have a complementary relationship, and causes the imaging unit to acquire image data including ach of information of a first image related to the light beam having the first wavelength and information of a second image related to the light beam having the second wavelength; and a processor configured to extract unevenness information of the subject by comparing the information of the first image with the information of the second image, wherein the complementary relationship is a relationship in a certain pixel of the imaging unit, in which:

when the light beam intensity of the first wavelength is increased, the light beam intensity of the second wavelength is weakened in the same certain pixel, or when the light beam intensity of the second wavelength is increased, the light beam intensity of the first wavelength is weakened in the same certain pixel.

7. The optical inspection apparatus according to claim 6, wherein
the processor is configured to compare the information of the first image and the information of the second image by four arithmetic processing of the information of the first image and the information of the second image.

8. The optical inspection apparatus according to claim 7, wherein
the processor is configured to perform four arithmetic processing with respect to the information of the first image and the information of the second image after performing arithmetic processing of convoluting an image filter or before performing arithmetic processing of convoluting an image filter with respect to at least one of the information of the first image and the information of the second image.

9. The optical inspection apparatus according to claim 8, wherein
when the processor performs arithmetic processing of convoluting the image filter with respect to each of the information of the first image and the information of the second image,
the processor is configured to perform arithmetic processing of convoluting a first image filter with respect to the information of the first image, and
the processor is configured to perform arithmetic processing of convoluting a second image filter different from the first image filter with respect to the information of the second image.

10. The optical inspection apparatus according to claim 9, wherein the processor is configured to
use an image filter of emphasizing flatness of an image as the first image filter with respect to the information of the first image, and use an image filter of enhancing a contour of an image as the second image filter with respect to the information of the second image.

11. The optical inspection apparatus according to claim 6, wherein the color filter is configured to
emit the light beam having the first wavelength and a light beam having a third wavelength different from the second wavelength toward the imaging unit in accordance with the light beam direction from the subject in a state in which the light beam intensity of the first wavelength, the light beam intensity of the second wavelength, and a light beam intensity of the third wavelength have a complementary relationship, and causes the imaging unit to acquire each of the information of the first image, the information of the second image, and information of a third image related to the light beam having the third wavelength, and the processor is configured to extract the unevenness information of the subject by comparing at least two pieces of information of the information of the first image, the information of the second image, and the information of the third image.

12. An optical inspection apparatus, comprising:

a camera including an image sensor configured to:
acquire image data by the image sensor, the image data including:
a light beam having a first wavelength in accordance with a first scattering angle from a subject as information of a first image, and
a light beam having a second wavelength different from the light beam having the first wavelength as information of a second image in accordance with a second scattering angle different from the first scattering angle from the subject, and
acquire a light beam intensity of the first wavelength and a light beam intensity of the second wavelength as a complementary relationship by the image sensor; and a processor configured to extract surface information of the subject by comparing the information of the first image and the information of the second image, wherein the complementary relationship is a relationship in a certain pixel of the imaging unit, in which:
when the light beam intensity of the first wavelength is increased, the light beam intensity of the second wavelength is weakened in the same certain pixel, or
when the light beam intensity of the second wavelength is increased, the light beam intensity of the first wavelength is weakened in the same certain pixel.

* * * * *

UNITED STATES PATENT AND TRADEMARK OFFICE
CERTIFICATE OF CORRECTION

| | | |
|---|---|---|
| PATENT NO. | : 11,906,439 B2 | Page 1 of 1 |
| APPLICATION NO. | : 17/681396 | |
| DATED | : February 20, 2024 | |
| INVENTOR(S) | : Hiroya Kano et al. | |

It is certified that error appears in the above-identified patent and that said Letters Patent is hereby corrected as shown below:

On the Title Page

In Item (73), Assignees, "Kaushiki" should read as --Kabushiki--.

Signed and Sealed this
Eighth Day of April, 2025

Coke Morgan Stewart
*Acting Director of the United States Patent and Trademark Office*